(12) United States Patent
Vishwakarma et al.

(10) Patent No.: US 10,509,586 B2
(45) Date of Patent: Dec. 17, 2019

(54) SYSTEM AND METHOD FOR CAPACITY FORECASTING IN BACKUP SYSTEMS

(71) Applicant: EMC IP Holding Company LLC, Hopkinton, MA (US)

(72) Inventors: Rahul Vishwakarma, Bangalore (IN); Supriya Kannery, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 79 days.

(21) Appl. No.: 15/960,665

(22) Filed: Apr. 24, 2018

(65) Prior Publication Data
US 2019/0324652 A1     Oct. 24, 2019

(51) Int. Cl.
*G06F 3/06*     (2006.01)
*G06N 5/04*     (2006.01)

(52) U.S. Cl.
CPC .............. *G06F 3/065* (2013.01); *G06F 3/067* (2013.01); *G06F 3/0619* (2013.01); *G06F 3/0653* (2013.01); *G06N 5/048* (2013.01)

(58) Field of Classification Search
CPC ........ G06F 3/065; G06F 3/067; G06F 3/0653; G06F 3/0619; G06N 5/048
See application file for complete search history.

(56) References Cited

U.S. PATENT DOCUMENTS

| | | | | |
|---|---|---|---|---|
| 5,475,433 A | * | 12/1995 | Jeong | H04N 19/112 375/240.05 |
| 8,359,597 B1 | * | 1/2013 | John | G06F 9/5044 706/25 |
| 10,146,469 B2 | * | 12/2018 | Polkovnikov | G06F 3/0611 |
| 2007/0142936 A1 | * | 6/2007 | Denison | G05B 13/0275 700/29 |
| 2015/0286507 A1 | * | 10/2015 | Elmroth | G06F 11/3442 718/104 |

OTHER PUBLICATIONS

Dell EMC Advanced Monitoring & Reporting Services, "Manage, Automate and Predict Your Environment", Dell Inc., 2016 (2 pages).
Compellent Technologies, "Data Progression, The Industry's Only Proven Automated Tiered Storage", Eden Prairie, MN, 2011. (4 pages).
"Dell EMC Isilon Insightiq, Customizable analytics platform to accelerate workflows and applications on Isilon clusters", Dell Inc. 2017 (5 pages).

* cited by examiner

*Primary Examiner* — Ramon A. Mercado
(74) *Attorney, Agent, or Firm* — Chamberlain, Hrdlicka, White, Williams & Aughtry

(57) ABSTRACT

A backup system for storing a copy of client data includes a persistent storage and a forecaster. The persistent storage stores the copy of the client data. The forecaster obtains storage use rates of the persistent storage over a prior time period; selects a first prediction period based on the prior time period; partitions the prior time period to obtain partitioned time periods; fuzzifies the storage use rates over the prior time period to obtain fuzzified storage use rates over the prior time period; applies a higher order fuzzy time series operator to the fuzzified storage use rates over the prior time period to obtain higher order forecasting functions; calculates a fuzzified forecast for the selected first prediction period using the higher order forecasting functions; and defuzzifies the fuzzified forecast to obtain a forecast for the first prediction period.

20 Claims, 12 Drawing Sheets

| Day | Maximum used storage capacity (%) |
|---|---|
| 1 | 7 |
| 2 | 13 |
| 3 | 33 |
| 4 | 62 |
| 5 | 70 |
| 6 | 58 |
| 7 | 55 |
| 8 | 60 |
| 9 | 65 |

FIG. 5A

| Day | Maximum used storage capacity (%) |
|---|---|
| 1 | 7 |
| 2 | 13 |
| 3 | 33 |
| 4 | 62 |
| 5 | 70 |
| 6 | 58 |
| 7 | 55 |
| 8 | 60 |
| 9 | 65 |

| Day | Fuzzified maximum used storage capacity |
|---|---|
| 1 | A1 |
| 2 | A1 |
| 3 | A2 |
| 4 | A4 |
| 5 | A4 |
| 6 | A3 |
| 7 | A3 |
| 8 | A3 |
| 9 | A4 |

FIG. 5B

|         | to A1 | to A2 | to A3 | to A4 |
|---------|-------|-------|-------|-------|
| from A1 | 1     | 1     | 0     | 0     |
| from A2 | 0     | 0     | 0     | 1     |
| from A3 | 0     | 0     | 2     | 1     |
| from A4 | 0     | 0     | 1     | 1     |

FIG. 5C

SYSTEM AND METHOD FOR CAPACITY FORECASTING IN BACKUP SYSTEMS

BACKGROUND

Computing devices may include any number of internal components such as processors, memory, and persistent storage. Each of the internal components may operate with other components of the computing devices. For example, some processors store generated data in a persistent storage and may utilize capacity of the memory to perform computations.

In a network environment, computing devices may store data in a backup system. Storing data in a backup system may reduce the likelihood that the data is lost due to a catastrophic failure of a computing device.

SUMMARY

In one aspect, a backup system for storing a copy of client data in accordance with one or more embodiments of the invention includes a persistent storage and a forecaster. The persistent storage stores the copy of the client data. The forecaster obtains storage use rates of the persistent storage over a prior time period; selects a first prediction period based on the prior time period; partitions the prior time period to obtain partitioned time periods; fuzzifies the storage use rates over the prior time period to obtain fuzzified storage use rates over the prior time period; applies a higher order fuzzy time series operator to the fuzzified storage use rates over the prior time period to obtain higher order forecasting functions; calculates a fuzzified forecast for the selected first prediction period using the higher order forecasting functions; and defuzzifies the fuzzified forecast to obtain a forecast for the first prediction period.

In one aspect, a method for operating a backup system in accordance with one or more embodiments of the invention includes obtaining storage use rates of a persistent storage over a prior time period; selecting a first prediction period based on the prior time period; partitioning the prior time period to obtain partitioned time periods; fuzzifying the storage use rates over the prior time period to obtain fuzzified storage use rates over the prior time period; applying a higher order fuzzy time series operator to the fuzzified storage use rates over the prior time period to obtain higher order forecasting functions; calculating a fuzzified forecast for the selected first prediction period using the high order forecasting functions; and defuzzifying the fuzzified forecast to obtain a forecast for the first prediction period. The persistent storage stores a copy of client data.

In one aspect, a non-transitory computer readable medium in accordance with one or more embodiments of the invention includes computer readable program code, which when executed by a computer processor enables the computer processor to perform a method for operating a backup system, the method includes obtaining storage use rates of a persistent storage over a prior time period; selecting a first prediction period based on the prior time period; partitioning the prior time period to obtain partitioned time periods; fuzzifying the storage use rates over the prior time period to obtain fuzzified storage use rates over the prior time period; applying a higher order fuzzy time series operator to the fuzzified storage use rates over the prior time period to obtain higher order forecasting functions; calculating a fuzzified forecast for the selected first prediction period using the high order forecasting functions; and defuzzifying the fuzzified forecast to obtain a forecast for the first prediction period. The persistent storage stores a copy of client data.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 5A shows a diagram of an example of used storage capacity of a backup system.

FIG. 5B shows a diagram of used storage capacity of FIG. 5A after being fuzzified.

FIG. 5C shows a diagram of a matrix used to generate a forecast using the fuzzified used storage capacity of FIG. 5B.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for storing data from clients. A system may in accordance with one or more embodiments of the invention may include any number of clients that store data in a backup system.

In one or more embodiments of the invention, the backup system may proactively monitor the data storage behavior of the clients and forecast future data storage behavior of the clients. Based on the forecasting, the backup system may modify its data storage behavior to improve the likelihood that the backup system will have sufficient storage capacity in the future to meet data storage needs of the clients.

In one or more embodiments of the invention, the forecasting is performed using a predictive analysis. The predictive analysis may be a high order fuzzy time series analysis applied to the available storage capacity of the backup system. The predictive analysis may provide a forecast of the future storage needs of the clients.

In one or more embodiments of the invention, the backup system takes action to reduce a rate of storing client data when a forecast indicates that the backup system will not have sufficient data storage capacity to meet the client data storage needs of the clients in the future. The actions may be, for example, to reduce a frequency of storing client data, to reduce a quantity of the stored client data, and to reduce a redundancy of the stored client data. The actions may be other actions without departing from the invention.

Figure 1:
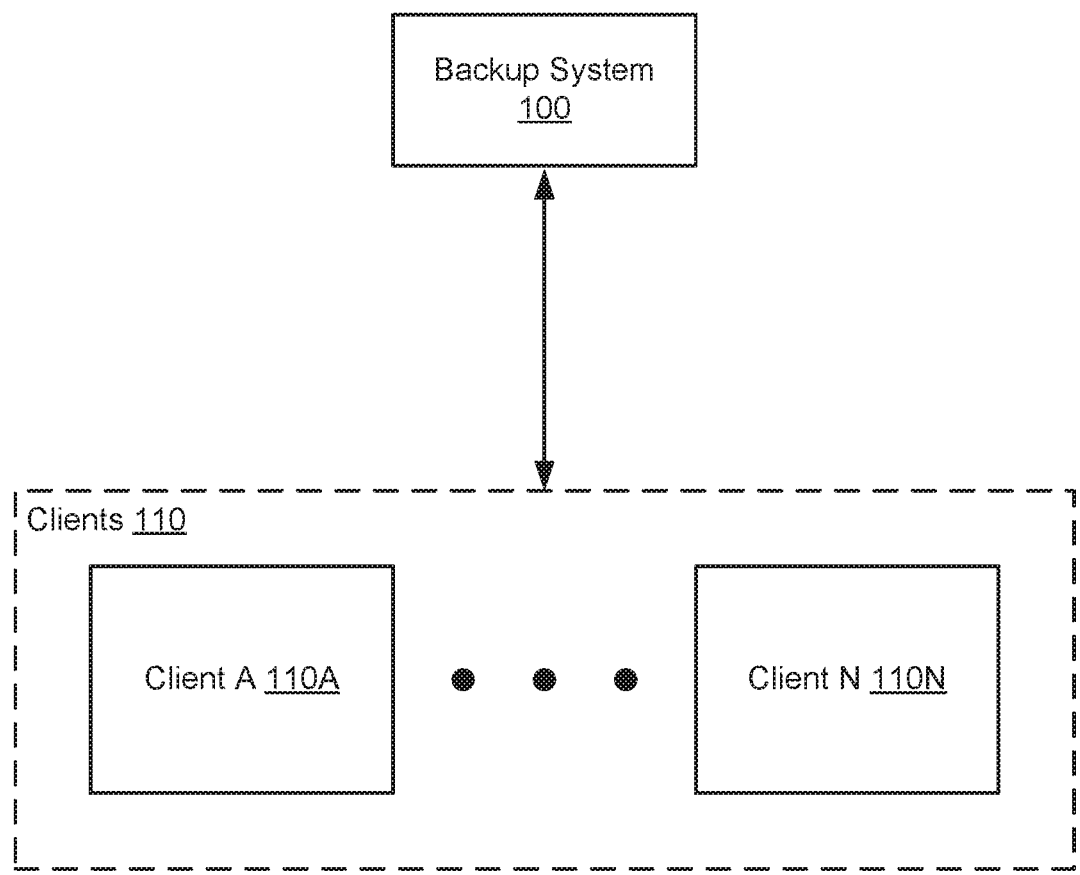
FIG. 1 shows a diagram of a system in accordance with one or more embodiments of the invention.

FIG. 1 shows a system in accordance with one or more embodiments of the invention. The system may include a backup system (100) that stores data from clients (110). The backup system (100) may forecast the utilization rate of the storage capacity of the backup system (100). If the forecast indicates that the backup system (100) will not have sufficient storage capacity to meet the data storage needs of the clients (110), the backup system (100) may perform a modification of the backup system (100) based on the forecast. The modification may improve the likelihood that the backup system (100) will have sufficient available storage capacity to meet the data storage needs of the clients (110) during the forecast period. Each of the components of the system shown in FIG. 1 may be operably connected to each other using any combination and quantity of wired and/or wireless networks. Each component of the system is discussed below.

In one or more embodiments of the invention, the backup system (100) stores data, e.g., client data, from the clients (110). The client data data may include, for example, audio files, image files, video files, databases, client identifiers, network information, and any other type of data without departing from the invention.

In one or more embodiments of the invention, the backup system (100) generates forecasts of the storage use rates of the data storage capacity of the backup system (100). The backup system (100) may take action, based on the forecasts, to improve the likelihood that the backup system (100) will have sufficient data storage capacity to store data from the clients during the forecast periods.

In one or more embodiments of the invention, the backup system (100) modifies policies that govern the storage of data from the clients in the backup system (100) based on the forecasts. The modifications may include, for example, decreasing a frequency of storage of client data, excluding a portion of client data from storage in the backup system (100), etc.

In one or more embodiments of the invention, the backup system (100) is implemented as a computing device. The computing devices may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the backup system (100) described throughout this application and/or all, or a portion thereof, of the methods illustrated in FIGS. 4A-4E. For additional details regarding computing devices, See FIG. 6.

In one or more embodiments of the invention, the backup system (100) is implemented as a computer cluster. The computer cluster may be multiple computing devices orchestrated to perform the functionality of the backup system (100) described throughout this application and/or all, or a portion thereof, of the methods illustrated in FIGS. 4A-4E. For additional details regarding the backup system, See FIG. 2.

In one or more embodiments of the invention, the clients (110) store data in and retrieve stored data from the backup system (100). The clients (110) may store data in the backup system (100) to, for example, store a copy of data for data integrity purposes, store a copy of the data on the backup system (100) only to decrease a use rate of the local storage of the client, etc.

In one or more embodiments of the invention, the clients (110A, 110N) are implemented as computing devices. The computing devices may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of the clients (110A, 110N) described throughout this application. For additional details regarding computing devices, See FIG. 6.

While the system of FIG. 1 has been illustrated as including a limited number of components for the sake of brevity, the system may include additional components (not shown), fewer components, and/or different components (not shown) without departing from the invention.

Figure 2:
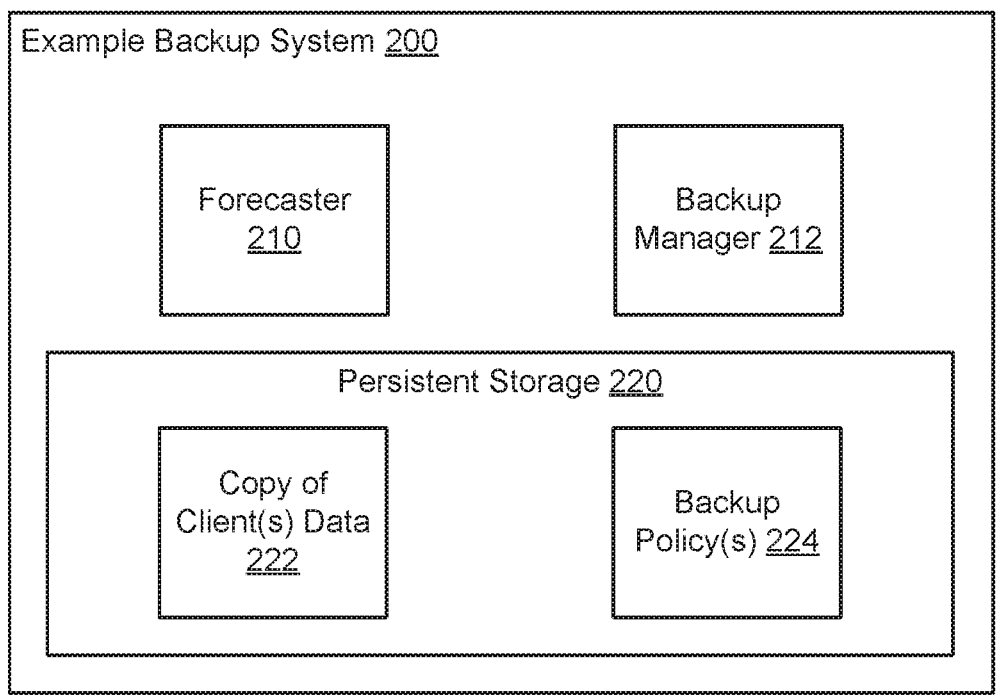
FIG. 2 shows a diagram of an example backup system in accordance with one or more embodiments of the invention.

FIG. 2 shows a diagram of an example backup system (200) in accordance with one or more embodiments of the invention. The example backup system (200) may be similar to the backup system (100, FIG. 1) discussed above. As discussed above, the example backup system (200) may store client data and/or provide stored client data. To increase the likelihood that the example backup system (200) has sufficient available storage capacity to handle the data storage needs of the clients in the future, the example backup system (200) may generate forecasts of the store use rate of the storage capacity of the example backup system (200). Based on the generated forecasts, the example backup system (200) may modify its data storage behavior, or the data storage behavior of other components of the system of FIG. 1, if the forecasts indicate that the example backup system (200) is unlikely to have sufficient available storage capacity to handle the storage needs of the clients during a forecast period. To provide the aforementioned functionality, the example backup system may include a forecaster (210), a backup manager (212), and a persistent storage (220). The persistent storage (220) may include data structures utilized by the aforementioned components of the example backup system (200). Each component of the example backup system (200) is discussed below.

In one or more embodiments of the invention, the forecaster (210) generates forecasts of the storage use rates of the storage capacity of the backup system (200) for forecast periods. The forecast periods may be periods of time in the future. To generate a forecast, the forecaster (210) may obtain actual storage use rates of the storage capacity of the backup system over a predetermined period of time in the past. The forecaster (210) may perform a predictive analysis of the actual storage use rates to generate a forecast for a future period of time, e.g., a forecast period. The actual storage use rates may be obtained from, for example, system logs that track the amount of used storage space of the storage capacity of the backup system.

In one or more embodiments of the invention, the predictive analysis is a higher-order fuzzy time series (HOFTS) applied to generate a prediction of the storage use rates of the storage capacity of the persistent storage (220). The HOFTS may be a capacity forecasting model. Generating the capacity forecasting model may include: (i) obtaining actual storage use rates of the persistent storage (220) over time to generate historical data points, (ii) fuzzifying the historical data points based on linguistic terms, (iii) performing analysis of the fuzzified historical data points to generate a forecast of the fuzzified historical data points for future time periods, and (iv) defuzzifying the forecasted fuzzified historical data points for the future time periods to obtain a forecast of the storage use rates of the persistent (220) for the future time periods.

In one or more embodiments of the invention, a historical data point is a representation of the storage use rate of the storage capacity of the example backup system (200) for a period of time. The period of time may be, for example, a day. Thus, each historical data point may associate a storage use rate of the storage capacity with a period of time. Any number of historical data points may be generated. In other words, the period of time on which a forecast is based may be discretized into any number of periods of time. A collection of historical data points may describe the storage use rates of the storage capacity of the example backup system (200) over a prior time period.

In one or more embodiments of the invention, the process of fuzzifying a historical data point includes assigning linguistic terms to a historical data point. In one or more embodiments of the invention, a linguistic term is the representation of an interval within a range of values of the historical data points. A linguistic term may be, for example, a triangular function with the maximum point located at the midpoint of the associated interval and the low points located at an interval's length away from the midpoint.

The process of fuzzifying a historical data point may include assigning a membership degree of a historical data point to each linguistic term and ranking the linguistic terms with the highest membership degrees. A membership degree may be a numerical value between 0 and 1 that represents the association between a historical data point and a linguistic term. A membership degree of a historical data point to a linguistic term may increase as the difference between a storage use rate and the midpoint of the interval associated with the linguistic term increases. For example, a historical data point may have a membership degree of 0.9 to a first linguistic term due to the data point having a value close to the midpoint of the interval associated with the first linguistic term and a membership degree of 0.1 to a second linguistic term due to the historical data point having a value relatively far from the midpoint of the interval associated with the second linguistic term. Each historical data point may be converted to a linguistic term that has the highest membership degree to the historical data point.

In one or more embodiments of the invention, the relationships between each linguistic term of a corresponding historical data point and linguistic terms of other corresponding historical data points are used to generate a forecasted linguistic term corresponding to a future data point after the time period of the historical data points. The forecasted linguistic term may then be defuzzified. In other words, the forecasted linguistic term may be converted to a forecasted future data point by using the midpoint of the forecasted linguistic term.

The forecasted future data point may then be used by the backup manager (212) to determine whether further action(s) will be performed. For example, the forecasted future data point may be compared to the storage capacity of the persistent storage. If the future data point indicates a storage use rate that is greater than the storage capacity of the persistent storage, the backup manager (212), or other entity, may take action to reduce the storage use rate in the future.

In one or more embodiments of the invention, the forecaster (210) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the forecaster (210) described throughout this application and/or all or a portion of the methods illustrated in FIGS. 4A-4E.

In one or more embodiments of the invention, the forecaster (210) is implemented as computer instructions (e.g. computer code) stored on a persistent storage that when executed by a processor of the example backup system (200) that cause the example backup system (200) to provide the functionality of the forecaster (210) described throughout this application and/or all or a portion of the methods illustrated in FIGS. 4A-4E.

In one or more embodiments of the invention, the backup manager (212) monitors the copy of client(s) data (222) in the persistent storage (220). The backup manager (212) obtains and/or store copies of the client data in accordance with backup policy(s) (224). Each backup policy of the backup policy(s) (224) may specify one or more of: (i) client data that is to be stored in the persistent storage (220), (ii) a frequency of storage of the client data, and (iii) redundancy levels, prioritization levels, or other parameters that impact the quality of storage service provided by the example backup system (200). Each backup policy may specify additional, fewer, and/or different instructions that control what, when, and how client data is stored by the example backup system (200) without departing from the invention.

In one or more embodiments of the invention, the backup manager (212) modifies the backup policy(s) (224) in response to forecasts generated by the forecaster (210). For example, when the forecaster (210) generates a forecast that predicts that example backup system (200) will not have sufficient storage capacity to store client data at a point in time in the future, the backup manager (212) may modify one or more policies of the backup policy(s) (224) to increase the likelihood that the example backup system (200) will have sufficient storage capacity at the point in time in the future.

In one or more embodiments of the invention, the backup manager (212) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup manager (212) described throughout the application and/or all or a portion of the methods illustrated in FIGS. 4A-4E.

In one or more of embodiments of the invention, the backup manager (212) is implemented as computer instructions, e.g. computer code, stored on a persistent storage that when executed by a processor of the example backup system (200) cause the example backup system (200) to provide the functionality of the backup manager (212) described throughout the application and/or all or a portion of the methods illustrated in FIGS. 4A-4E.

The persistent storage (220) may store data and may be, for example, hard disk drives, solid state drives, tape drives, or any combination thereof. The persistent storage (220) may be other types of digital storage without departing from the invention. The persistent storage (220) may be virtualized without departing from the invention.

The persistent storage (220) may include data structures used by the forecaster (210) and/or the backup manager (212). The data structures may include a copy of client(s) data (222) and backup policy(s) (224). The persistent storage (220) may include additional, fewer, and/or different data structures without departing from the invention. Each of the aforementioned data structures is discussed below.

The copy of client(s) data (222) may be a data structure that includes data stored by clients (e.g., 110A, 110N, FIG. 1). The copy of client(s) data (222) may include a copy of all or a portion of the client data of each client. The copy of client(s) data (222) may include, for example, audio files, video files, databases, client hardware identifiers, network information, and/or any other types of data without departing from the invention.

The backup policy(s) (224) may be a data structure that specifies instructions or parameters that govern the storage of client data in the persistent storage (220). The backup policy(s) (224) may specify instructions that, for example, regulate when client data is stored in the persistent storage (220). The backup policy(s) (224) may specify instructions that govern other aspects of the storage of client data in the persistent storage (220) without departing from the invention. The backup policy(s) (224) may be used by the backup manager (212) and/or other entities. For additional details regarding the backup policy(s) (224), See FIG. 3.

Figure 3:
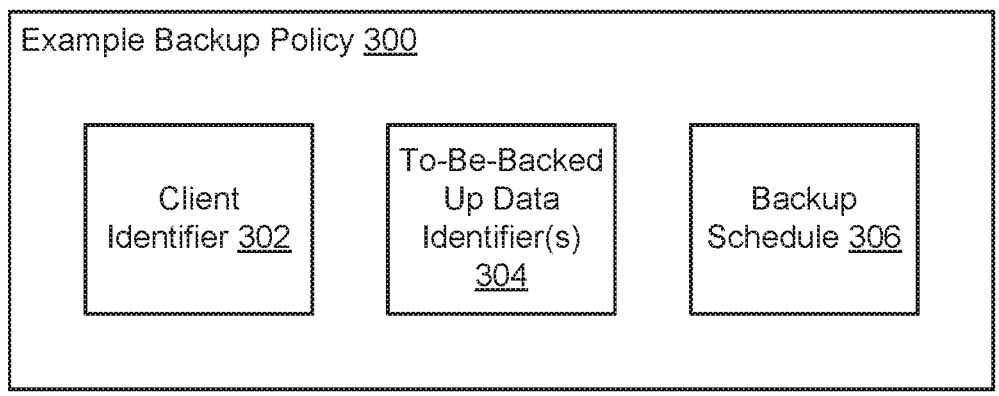
FIG. 3A shows a diagram of an example backup policy in accordance with one or more embodiments of the invention.

FIG. 3 shows a diagram of an example backup policy (300) in accordance with one or more embodiments of the invention. The example backup policy (300) may be similar to the backup policy(s) (224, FIG. 2) discussed above.

In one or more embodiments of the invention, the example backup policy (300) is a data structure that specifies instructions that govern the storage of client data in a backup system. The example backup policy (300) may include a client identifier (302), to-be-backed-up data identifier(s) (304), and a backup (306). Each portion of the example backup policy (300) is discussed below.

In one or more embodiments of the invention, the client identifier (302) is a data structure that includes information that enables a client to be identified. The client identifier (302) may be, for example, a uniform resource indicator associated with the client, an IP address of the client, or any other identifier associated with the client without departing from the invention.

In one or more embodiments of the invention, the to-be-backed-up data identifier(s) (304) includes information that enables to-be-backed-up client data to be identified. The to-be-backed-up data identifier(s) (304) may specify, for example, uniform resources indicators, entries of a namespace, or any other type of identifier that enables the to-be-backed-up client data to be discriminated from the other data of the client.

In one or more embodiments of the invention, the backup schedule (306) specifies when client data identified by the to-be-backed-up data identifier(s) (304) is stored in the backup system. The backup schedule (306) may specify that client data be stored periodically (e.g. every day, every week, etc.) or periodically (e.g., enumerated points in time). Additionally, the backup schedule (206) may specify that the client data be stored on at a predetermined date. The backup schedule (206) may specify that client data be stored up when a predetermined event occurs such as, for example, when a client requests that the client data be stored. The backup schedule (306) may specify when client data is stored using different criteria without departing from the invention.

As discussed above, the example backup system (200, FIG. 2) may generate storage capacity forecasts and take action if the generated forecasts indicate that the example backup system (200, FIG. 2) is unlikely to be able to meet the future storage needs of the clients served by the example backup system (200, FIG. 2).

Figure 4A:
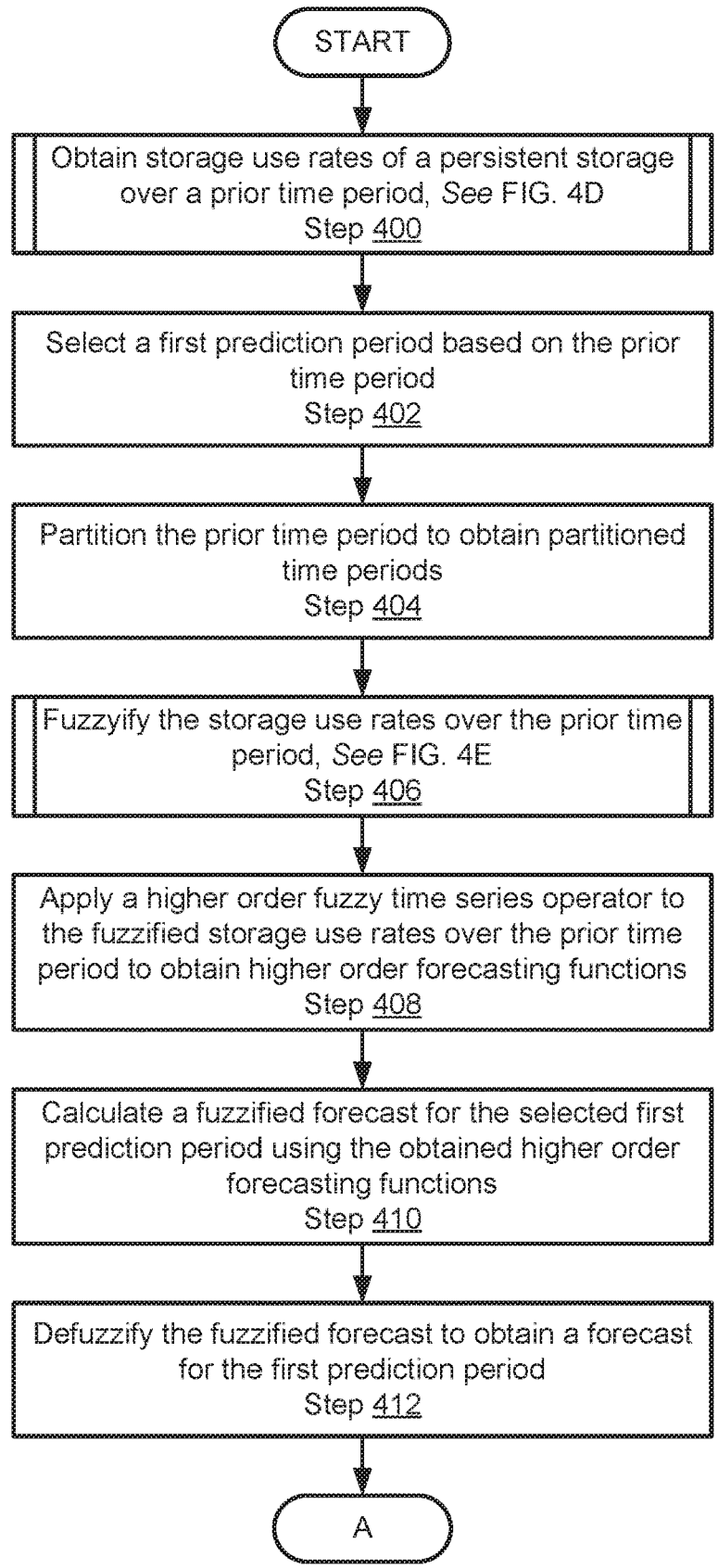
FIG. 4A shows a flowchart of a method of modifying the client data storage behavior of a backup system in accordance with one or more embodiments of the invention.

FIG. 4A shows a first portion of a flowchart of a method in accordance with one or more embodiments of the invention. The flowchart of the method continues onto FIG. 4B. The method depicted in FIGS. 4A-4C may be used to modify the storage of client data by a storage system in accordance with one or more embodiments of the invention. The method shown in FIGS. 4A-4C may be performed by, for example, a backup system (e.g. 100, FIG. 1). Other components of the system illustrated in FIG. 1 may perform the method of FIGS. 4A-4C without departing from the invention.

In Step 400, storage use rates of a persistent storage over a prior time period are obtained.

In one or more embodiments of the invention, the storage use rates are the amount of data storage that is used by the backup system over a prior time period. In other words, the storage use rates may represent the utilized capacity of a persistent storage.

The prior time period may be a time period, in the past, during which storage use rates of the backup system was tracked. A prior time period may be, for example, the last ten days. The prior time period may be other durations of time and/or start and/or stop at different points in time in the past without departing from the invention. For example, a prior time period may be from then days in the past to three days in the past.

In one or more embodiments of the invention, the backup system obtains the storage use rates using its own logs of data stored in its persistent storage.

In one or more embodiments of the invention, the backup system obtains the storage use rates using information provided by clients served by the backup system. The information may be, for example, system logs that specify when and the quantity of client data stored in the backup system.

In one or more embodiments of the invention, the storage use rates include a time series relationship between the available storage capacity of the backup system and the point in time of the available storage capacity. The storage use rates may be, for example, a table that lists the available storage capacity as a percentage of the total capacity of the backup system for each day over a period of time. The storage use rates may be specified using other relationships without departing from the invention.

Figure 4B:
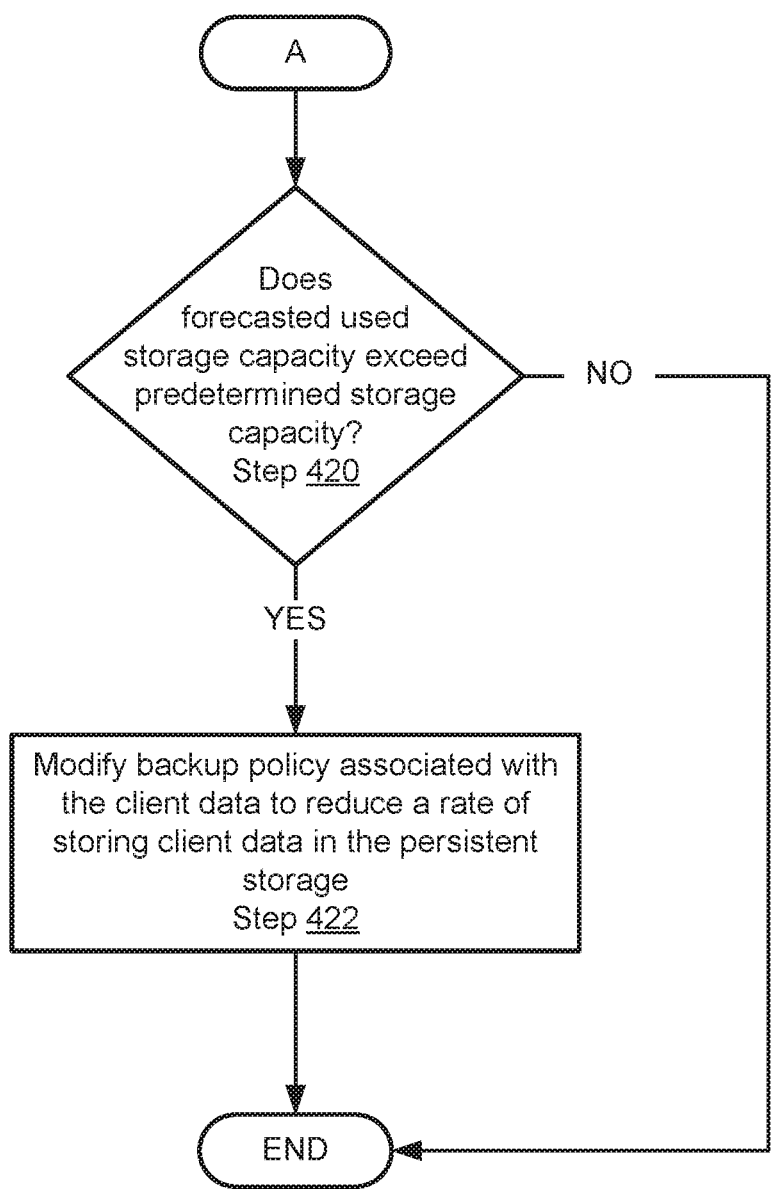
FIG. 4B shows a continuation of the flowchart of FIG. 4A.
Figure 4C:
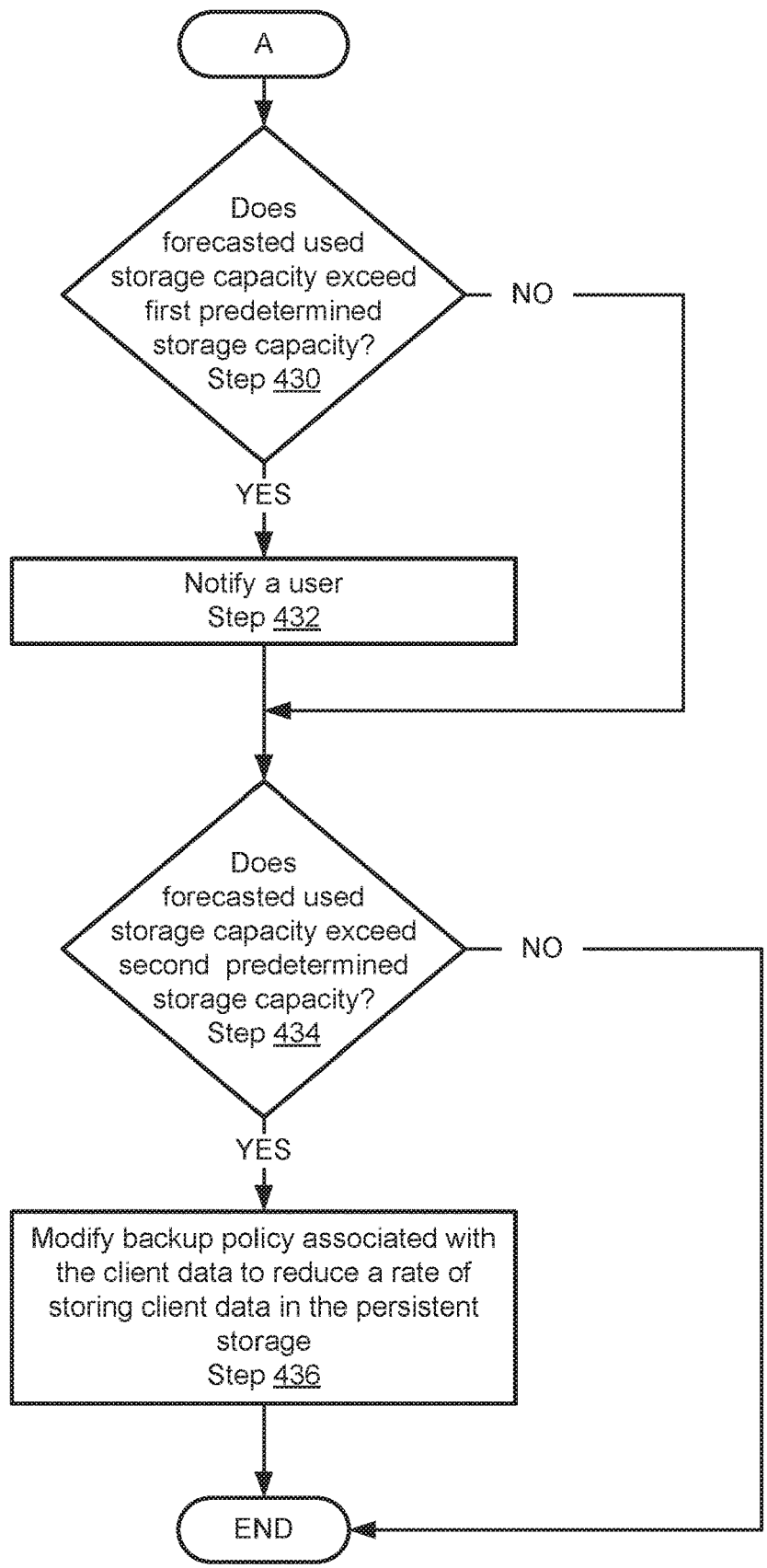
FIG. 4C shows a continuation of the flowchart of FIG. 4A.
Figure 4D:
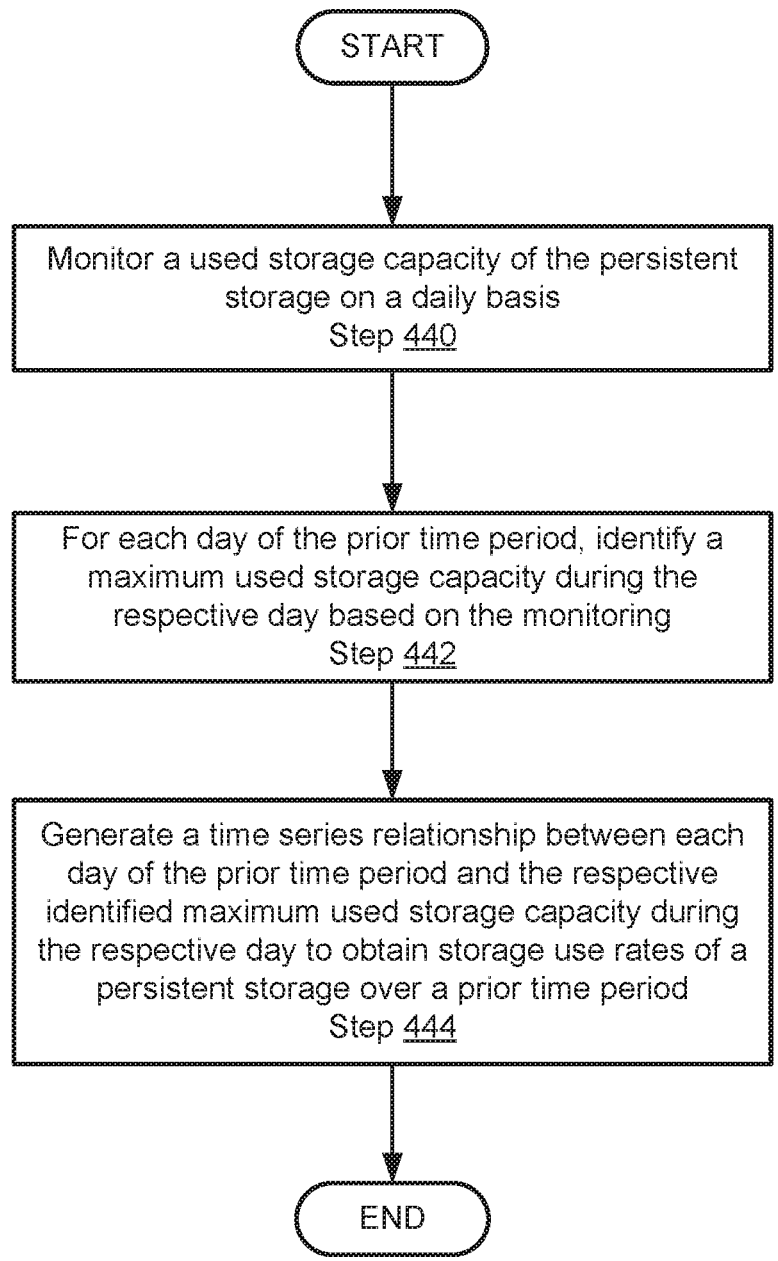
FIG. 4D shows a flowchart of a method of obtaining storage use rates of a persistent storage in accordance with one or more embodiments of the invention.

In one or more embodiments of the invention, the storage use rates of the persistent storage over a prior time period are obtained via the method illustrated in FIG. 4D. The storage use rates may be obtained via other methods without departing from the invention.

In Step 402, a first prediction period is selected based on the prior time period.

In one or more embodiments of the invention, the first prediction period is a time period in the future. The first prediction period may be, for example, one day following the prior time period.

In Step 404, the prior time period is partitioned to obtain partitioned time periods.

In one or more embodiments of the invention, the partitioned time periods are time periods within the prior time period that may be used to specify data points for a predictive analysis. The predictive analysis may be, for example, a time series analysis.

In one or more embodiments of the invention, each respective partitioned time period may be associated with corresponding storage use rates obtained in Step 400. Thereby, a time series relationship between storage use rates over the prior time period may be established.

In Step 406, the storage use rates over the prior time period are fuzzified.

Figure 4E:
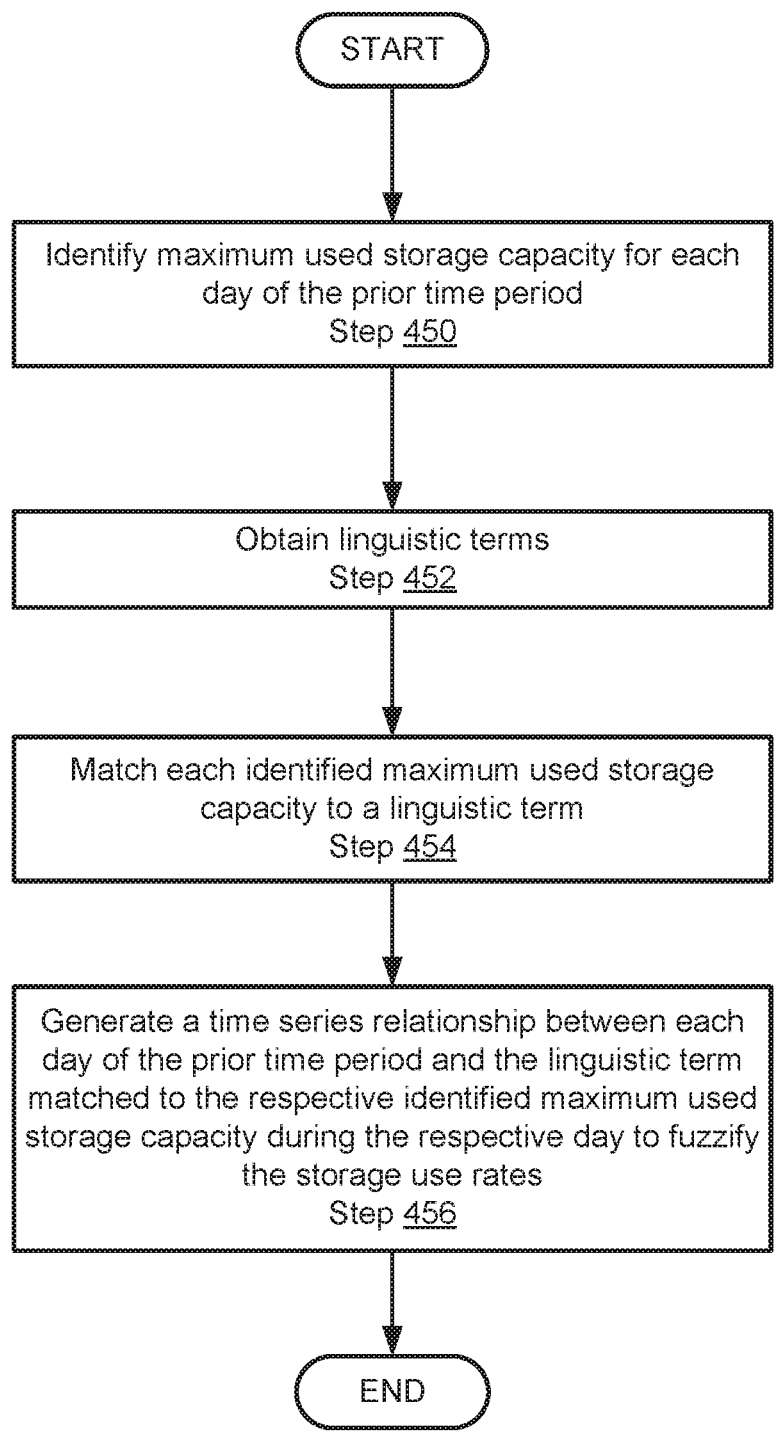
FIG. 4E shows a flowchart of a method of fuzzifying obtained storage use rates in accordance with one or more embodiments of the invention.

In one or more embodiments of the invention, the storage use rates over the prior time period are fuzzified via the method discussed in FIG. 4E. The storage use rates may be fuzzified via other methods without departing from the invention.

Fuzzifying the storage use rates may associate the storage use rate with a linguistic term and thereby generate a time series relationship of linguistic terms.

In one or more embodiments of the invention, the process of fuzzifying the storage use rates includes converting the obtained storage use rates to linguistic terms and generating a time series relationship between the linguistic terms and the associated partitioned time periods. A linguistic term may be an association between a storage capacity percentage value and an interval within a range of values. The range of values may include values between the maximum value of all used storage capacity values in the prior time period and the minimum value of all storage capacity values in the prior time period. The intervals may be any number of intervals within the range of values that are mutually exclusive. In other words, each interval within the range of values may not include values from other intervals, and every value in the range of values may be included in an interval.

In one or more embodiments of the invention, the intervals are associated with a linguistic term. The association between a storage capacity percentage and a linguistic term may be measured using a membership degree as a function of the storage capacity percentage. A membership degree may be the numerical representation of the association between a storage capacity percentage and a linguistic term. The function may be, for example, a triangular function of a storage capacity percentage that includes a maximum value of 1 located at a midpoint of the interval associated with the linguistic term and a minimum value of 0 located an interval's length away from the midpoint.

For example, a storage capacity percentage value may have a high membership degree (i.e., a number between 0 and 1) to a linguistic term when the difference between the storage capacity percentage and the midpoint of the interval corresponding to the linguistic term is small. In contrast, the storage capacity percentage may have a lower membership degree to the linguistic term if the difference between the storage capacity percentage and the midpoint is large. The membership degree to each linguistic term may be obtained for a storage capacity percentage. A storage capacity percentage may be converted to the linguistic term with the highest membership degree. The process of converting storage capacity percentages to linguistic terms may be repeated for each storage capacity percentage of the prior time period.

In Step 408, a higher order fuzzy time series operator is applied to the fuzzified storage use rates over the prior time period to obtain higher order forecasting functions.

In one or more embodiments of the invention, the higher order fuzzy time series operator tracks relationships between the linguistic terms associated with a partitioned time period and linguistic terms of prior partitioned time periods. A relationship may include an occasion in which one linguistic term in a partitioned time period follows another linguistic term in another partitioned time period. For example, a first partitioned time period may have a linguistic term A1. A second partitioned time period following the first partitioned time period may have a linguistic term A2. The higher order time series operator may track the number of occasions in which a partitioned time period is associated with linguistic term A1 and a following partitioned time period is associated with linguistic term A2. The process of tracking the frequency of a linguistic term following another linguistic term may be repeated for every linguistic term relationship in the prior time period.

In one or more embodiments of the invention, the higher order fuzzy time series operator tracks relationships between a linguistic term of a partitioned time period and multiple linguistic terms of a partitioned time period.

In one or more embodiments of the invention, the higher order forecasting functions are the obtained relationships between each linguistic term and the linguistic term(s) corresponding to prior partitioned time period(s). The higher order forecasting functions may be, for example, matrices where each row corresponds to a linguistic term and each column corresponds to a prior linguistic term. Each entry in a matrix may be a number that corresponds to the frequency that the linguistic term of the corresponding row of the entry is followed by the prior linguistic term of the corresponding column of the entry.

In one or more embodiments of the invention, additional higher order forecasting functions may be added according to the order of the forecasting method. In other words, the higher the order, the more matrices generated. An order may refer to the number of linguistic terms of prior partitioned time periods that are related to the following linguistic term. For example, a second order forecasting function may include the relationships between each linguistic term and the two prior linguistic terms, a third order forecasting function may include the relationship between each linguistic term and the three prior linguistic terms, etc.

In Step 410, a fuzzified forecast for the selected first prediction period is calculated using the obtained higher order forecasting functions.

In one or more embodiments of the invention, the higher order forecasting functions may be used to calculate a forecast linguistic term for the selected first prediction period. This may include using the last linguistic terms of the partitioned time periods that comes right before the selected first prediction period. The process may include assigning a weight to each preceding linguistic term and calculating a weighted linguistic term. A weight of a linguistic term may be a value corresponding to the frequency that the linguistic term precedes a linguistic term. The forecasted linguistic term may be calculated by applying a weight to each preceding linguistic term and averaging the preceding linguistic terms to obtain a forecasted linguistic term.

For example, for a selected prediction time period, preceding linguistic terms may include A1, A2, and A3, with A1 being the linguistic term corresponding to the last partitioned time period prior to the selected prediction time period and A3 as being the linguistic term corresponding to the third-to-last partitioned time period. Weights may be assigned to each linguistic term according to the frequency that the linguistic term precedes the last linguistic term. In other words, a weight of 0.67 may be assigned to A2 if the higher order fuzzy forecasting functions track that A1 is preceded by A2 2 times out of 3 total times that a linguistic term precedes A1. Additionally, a weight of 0.33 may be assigned to A3 if the higher order fuzzy forecasting functions track that A1 is preceded by A3 1 time out of 3 times that a linguistic term precedes A1. The fuzzified forecast may be calculated as the sum of each linguistic term multiplied by its corresponding weight. In this example, the fuzzified forecast may be the sum of 0.67 times A2 and 0.33 times A3.

In Step 412, the fuzzified forecast is defuzzified to obtain a forecast for the first prediction period.

In one or more embodiments of the invention, a forecast is defuzzified by converting each linguistic term of the fuzzified forecast to a real value and calculating the result. A linguistic term may be converted to a storage use rates by using the interval that is associated with the linguistic term. As discussed above, each linguistic term may be associated with an interval in the range of values. Each linguistic term may be converted to the midpoint of the associated interval for the purpose of calculating the forecast for the first prediction period. If a fuzzified forecast is defined by more than one linguistic term, the midpoints may be summed according to the weights associated with each linguistic term. For example, linguistic term A1 may be converted to a value of 10, and linguistic term A2 may be converted to a value of 20. If a fuzzified forecast is 0.67*A1+0.33*A2, the defuzzified forecast may be calculated as 13.3, or 0.67*10+0.33*20.

The method may proceed to FIG. 4B in accordance with one or more embodiments of the invention. The method may proceed to FIG. 4C in accordance with one or more embodiments of the invention.

As discussed above, a backup manager may take action in response to a forecast. FIGS. 4B and 4C show methods of taking action by a manager in accordance with one or more embodiments of the invention.

FIG. 4B shows a flowchart of a method in accordance with one or more embodiments of the invention. The method used in FIG. 4B may be used to take action based on a forecast in accordance with one or more embodiments of the invention. The method shown in FIG. 4B may be performed by, for example, the backup system (100, FIG. 1). Other component of the system illustrated in FIG. 1 may perform the method of FIG. 4B without departing from the invention.

In Step 420, it is determined whether a forecasted used storage capacity exceeds a predetermined storage capacity. If a forecasted used storage capacity does exceed the predetermined storage capacity, the method proceeds to Step 422. If the forecasted used storage capacity does not exceed the predetermined storage capacity, the method may end.

In one or more embodiments of the invention, the predetermined storage capacity is greater than 80% of the storage capacity of the backup system.

In Step 422, a backup policy is modified to reduce a rate of storing client data in the persistent storage.

In one or more embodiments of the invention, the backup policy is modified to reduce a frequency at which the client data is stored. For example, the frequency may be reduced from daily to every other day.

In one or more embodiments of the invention, the backup policy is modified to eliminate a portion of client data from being stored. For example, the client identifiers of the backup policy may be modified so that less of the client data is specified by the client identifiers.

In one or more embodiments of the invention, the backup policy is modified to reduce a redundancy of the stored client data. For example, the backup policy may be modified so that only a single copy, i.e., no redundancy, of the client data is stored in the backup system.

The method may end following Step 422.

FIG. 4C shows a flowchart of a method in accordance with one or more embodiments of the invention. The method used in FIG. 4C may be used to take action based on a forecast in accordance with one or more embodiments of the invention. The method shown in FIG. 4C may be performed by, for example, the backup system (100, FIG. 1). Other component of the system illustrated in FIG. 1 may perform the method of FIG. 4C without departing from the invention.

In Step 430, it is determined whether a forecasted used storage capacity exceeds a first predetermined storage capacity. If a forecasted used storage capacity does exceed the predetermined storage capacity, the method proceeds to Step 432. If the forecasted used storage capacity does not exceed the predetermined storage capacity, the method proceeds to Step 434.

In Step 432, a user is notified.

In one or more embodiments of the invention, a user is notified via a notification sent to a client, or other computing device. The notification may be, for example, an email, a text message, and/or other notifications without departing from the invention. The notification may include information that enables the user to identify that it is unlikely that the backup system will have sufficient storage capacity to provide data storage services to its served clients in the future.

In Step 434, it is determined whether a forecasted used storage capacity exceeds a second predetermined storage capacity. If a forecasted used storage capacity does exceed the predetermined storage capacity, the method proceeds to Step 436. If the forecasted used storage capacity does not exceed the predetermined storage capacity, the method may end.

In Step 436, a backup policy is modified to reduce a rate of storing the copy of the client data in the persistent storage.

In one or more embodiments of the invention, the backup policy is modified to reduce a frequency at which the client data is stored. For example, the frequency may be reduced from daily to every other day.

In one or more embodiments of the invention, the backup policy is modified to eliminate a portion of client data from being stored. For example, the client identifiers of the backup policy may be modified so that less of the client data is specified by the client identifiers.

In one or more embodiments of the invention, the backup policy is modified to reduce a redundancy of the stored client data. For example, the backup policy may be modified so that only a single copy, i.e., no redundancy, of the client data is stored in the backup system.

In one or more embodiments of the invention, the first threshold is smaller than the second threshold. For example, the first threshold may be 50% and the second threshold may be 80%. In a scenario in which the forecasted used storage capacity is 60%, the user may receive a notification but a backup policy may not be modified.

In one or more embodiments of the invention, the first threshold is larger than the second threshold. For example, the first threshold may be 80% and the second threshold may be 50%. In a scenario in which the forecasted used storage capacity is 60%, a backup policy may be modified but a user may not be notified.

The method may end following Step 436.

As discussed above, backup system may obtain storage use rates of a persistent storage over a prior time period to generate forecasts of future storage use rates.

FIG. 4D shows a method in accordance with one or more embodiments of the invention. The method used in FIG. 4D may be used to obtain storage use rates over a prior time period in accordance with one or more embodiments of the invention. The method may be performed by, for example, a backup system (e.g., 100, FIG. 1). Other components of the system illustrated in FIG. 1 may perform the method of FIG. 4D without departing from the invention.

In Step 440, a used storage capacity of the persistent storage is monitored on a daily basis.

In one or more embodiments of the invention, the used storage capacity is the amount of storage used by the persistent storage of the backup system relative to the total storage capacity of the persistent storage. The used storage capacity may be, for example, a percentage value with respect to the total storage capacity of the persistent storage. The used storage capacity percentage value may be monitored on a daily basis by tracking the used storage capacity throughout each day over a period of time.

In Step 442, for each day of the prior time period, a maximum used storage capacity(s) for each day during the respective day is identified based on the monitoring in Step 440.

In one or more embodiments of the invention, the amount of storage used by the backup system varies within a day. The forecaster may track the used storage throughout a day and identify the maximum used storage of that day. The process may be repeated for each day of the prior time period.

In Step 444, a time series relationship between each day of the prior time period and the respective identified maximum used storage capacity during the respective day is generated.

In one or more embodiments of the invention, the time series relationship is a table that lists each day of the prior time period and lists the maximum used storage capacity associated with each day of the prior time period. The time series relationship may be ordered from oldest day in the prior time period to newest day in the prior time period.

The method may end following Step 444.

As discussed above the backup system (100, FIG. 1) may fuzzify storage use rates.

FIG. 4E shows a method in accordance with one or more embodiments of the invention. The methods illustrated in FIG. 4E may be used to fuzzify storage use rates in accordance with one or more embodiments of the invention. The method may be performed by, for example, a backup system (e.g., 100, FIG. 1). Other components of the system illustrated in FIG. 1 may perform the method of FIG. 4E without departing from the invention.

In Step 450, a time series relationship is obtained including maximum used storage capacity for each day of the prior time period.

In one or more embodiments of the invention, the time series relationship is obtained via the method illustrated in FIG. 4D. Other methods may be used to obtain the time series relationship without departing from the invention.

In Step 452, linguistic terms are obtained.

In one or more embodiment of the invention, a linguistic term is a representation of an interval. A linguistic term may be obtained by partitioning a range of values into intervals of equal or different lengths. The range of values may be identified by comparing all of the maximum used storage capacities of every day in the prior time period and identifying the range of values that include all of the maximum used storage capacities. The range of values may be calculated by, for example, using the lowest value of the maximum used storage capacities of the prior time period as the lower bound of the range of values, and using the highest value of the maximum used storage capacity of the prior time period as the upper bound. The range of values may be partitioned into intervals that each includes values within the range of values. The number of intervals may be determined by, for example, Equation 1:

$$\text{Number of intervals} = 1 + \log_2(n) \quad (1)$$

In Equation 1, n may represent the number of days in the prior time period, and $\log_2(n)$ may be the logarithmic based 2 function of n, rounded to the nearest whole number. For example, if there are 100 days in tracked in the prior time period, the range of values may be partitioned into 7 intervals. Each interval may be associated with a linguistic term.

In one or more embodiments of the invention, a linguistic term may be defined by membership degrees as a function of the maximum used storage capacity. The membership degree is a number relating the association of a storage capacity to a linguistic term. The membership degree may be calculated using by Equation 2:

$$\mu = 1 - (|x - m| / \text{length}) \quad (2)$$

In Equation 2, $\mu$ may represent the membership degree of a storage capacity to a linguistic term, x may represent the value of the storage capacity, m may represent the midpoint of the interval associated with the linguistic term, and length may be the length of the interval. If using Equation 2 results in $\mu$ being a number below 0, the membership degree may be 0. The length of an interval may be calculated by taking the difference between the upper bound of the interval and the lower bound of the interval.

In Step 454, each identified maximum used storage capacity is matched to a linguistic term.

In one or more embodiments of the invention, each maximum storage capacity is assigned a membership degree for each linguistic term. A maximum used storage capacity may be matched to a linguistic term that corresponds to the highest membership degree. The process may be repeated for each identified maximum used storage capacity.

In Step 456, a time series relationship between each day of the prior time period and the linguistic term matched to the respective identified maximum used storage capacity during the respective day is generated.

In one or more embodiments of the invention, the time series relationship is a table that lists each day of the prior time period and lists the linguistic terms matched to the respective maximum used storage capacity associated with each day of the prior time period. The time series relationship may be ordered from oldest day in the prior time period to the newest day in the prior time period.

The method may end following Step 456.

Example 1

Consider a scenario in which a backup system has obtained the maximum used storage capacity of a backup system for each day of a prior time period of 9 days and performs a method for forecasting a storage capacity for a $10^{th}$ day. FIG. 5A shows a table of the maximum used storage capacity of the backup system corresponding to each day for a prior time period of 9 days. The number on the first column may represent the day following the start of the prior time period. The number on the second column may represent the maximum used storage capacity percent corresponding to the day on the first column.

As discussed above, the maximum used storage capacity for each day may be obtained by monitoring the used storage capacity of the backup system over the prior time period of 9 days. The prior time period may be partitioned to partitioned time periods of 1 day. For each partitioned time period, the maximum observed used storage capacity may be recorded and stored in the second column of FIG. 5A. The recorded maximum used storage capacity may be a percentage of the total storage capacity of the backup system.

The backup system may generate a range of values that includes each maximum used storage capacity of the prior time period. For the following example, the range of values may be between 1% and 80%. The range of values may be partitioned into intervals of equal length. The number of intervals may be determined by taking the number of days and applying Equation 1 with n being 9. Using Equation 1, the backup system may partition the range of values into 4 intervals of equal lengths. The 4 intervals may be 1%-20%, 21%-40%, 41%-60%, and 61%-80%.

Linguistic terms may be obtained using the generated intervals. As discussed above, a linguistic term is a representation of an interval. Each linguistic term may be associated with an interval. For the purposes of this example, linguistic term A1 may be associated with the interval 1%-20%, linguistic term A2 may be associated with the interval 21%-40%, linguistic term A3 may be associated with the interval 41%-60%, and linguistic term A4 may be associated with the interval 61%-80%.

The process of matching each maximum used storage capacity to a linguistic term may include obtaining a membership degree of a maximum used storage capacity to each linguistic term and identifying a linguistic term with the highest membership degree to the maximum used storage capacity. The membership degree may be calculated using Equation 2. For the maximum used capacity of Day 1, the membership degree to linguistic term A1 may be calculated using the midpoint of the interval associated with linguistic term A1, 10.5, as variable "m" of Equation 2, the value of the maximum used capacity, 7, as variable "x", and the length of the interval, 19, as variable "length" in Equation 2. The membership degree $\mu$ may be calculated as 0.82. The membership degree of the maximum used capacity of Day 1 to linguistic terms A2, A3, and A4 may be 0 due to the results of applying the respective midpoints and maximum used capacity values in Equation 2 as a number for $\mu$ less than 0. The process of calculating the membership degrees of a maximum used storage capacity to each linguistic term may be repeated for each maximum used storage capacity of the prior time periods.

A maximum used storage capacity may be matched to the linguistic term with the highest membership degree to the maximum used storage capacity. FIG. 5B shows two tables that relate the obtained maximum used storage capacity to the fizzified obtained maximum used storage capacity.

The first table may show the maximum used storage capacities of the prior time period of 9 days similar to that of FIG. 5A. The second table may include the fuzzified maximum used storage capacity of the first table. Each maximum used storage capacity may be fuzzified by replacing the maximum used storage capacity with a linguistic term as illustrated by arrows in FIG. 5B.

Once the maximum used storage capacity is fuzzified, a higher order fuzzy time series operator may be applied to obtain higher order forecasting functions. FIG. 5C shows a higher order forecasting function represented as a matrix. Each entry in the matrix may be a number corresponding to the number of times a linguistic term associated to the column of the entry follows the linguistic term associated with the row of the entry. A linguistic term may follow a preceding linguistic term by being associated with a day following the day of the preceding linguistic term.

For example, the entry on the first row and first column may illustrate the number of times that A1 follows A1, which occurs once, from Day 1 to Day 2, as seen in FIG. 5B. The entry on the first row and second column may illustrate the number of times that A2 follows A1, which occurs once, from Day 2 to Day 3, as seen in FIG. 5B.

Once the higher order fuzzy forecasting function is created, a forecasted linguistic term may be predicted. The forecasted linguistic term may be predicted by identifying the linguistic term associated with the last day of the prior time period. The last day of the prior time period may be 9. Therefore, the linguistic term associated with the last day may be linguistic term A4.

In order to generate a forecasted linguistic term, weights may be assigned to each linguistic term. A weight may be determined for each linguistic term by taking a fraction of the number of times the linguistic term follows the identified linguistic term over the total number of times that the identified linguistic term follows a linguistic term. The fourth row may be associated with the number of times A4 follows each linguistic term. Therefore, each weight may be determined using the fourth row. A1 may follow A4 0 times out of the 2 times, so A1 may have a weight of 0. A2 may follow A4 0 times of the 2 times, so A2 may have a weight of 0. A3 may follow A4 1 time of the 2 times, so A3 may have a weight of 0.5. A4 may follow A4 1 time of the 2 times, so A4 may have a weight of 0.5. Therefore, the forecasted linguistic term may be a combination of 0.5A3 and 0.5A4.

Finally, the forecasted linguistic term may be converted to a forecasted storage capacity using Equation 3:

$$x = w1*m1 + w2*m2 + w3*m3 + w4*m4 \qquad (3)$$

In Equation 3, x may be the forecasted storage capacity, w1 may be the weight assigned to a first linguistic term, m1 may be the midpoint of the interval associated to the first linguistic term, w2 may be the weight assigned to a second linguistic term, m2 may be the midpoint of the interval associated with the second linguistic term, etc. Using Equation 3, and substituting the respective midpoints of each interval, 10.5 for m1, 30.5 for m2, 50.5 for m3, and 70.5 for m4, as well as the assigned weights of 0 for w1, 0 for w2, 0.5 for w3, and 0.5 for w4, the forecasted storage capacity may be calculated as 60.5. Therefore, the backup system may forecast the storage capacity of the $10^{th}$ day to be 60.5%.

End of Example 1

Figure 6:
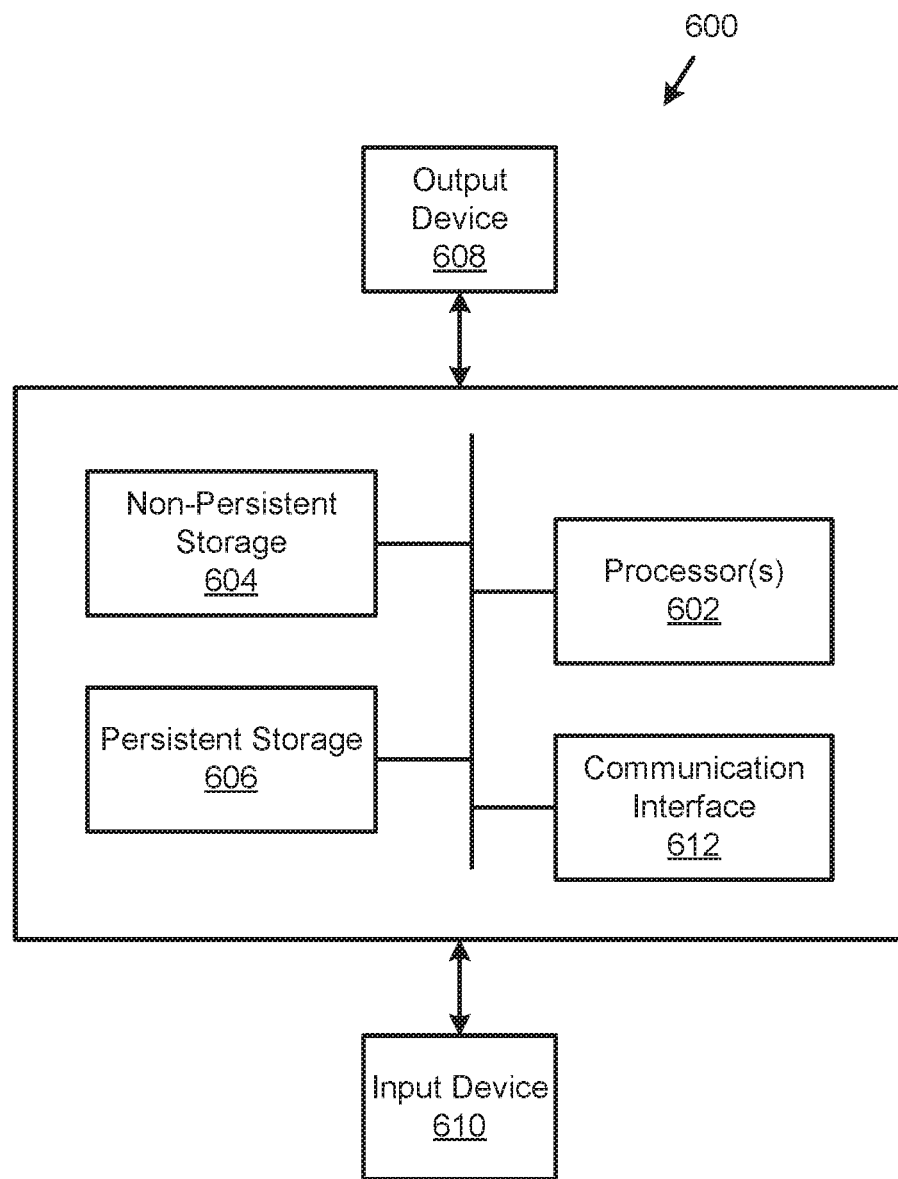
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may improve the reliability of backup systems.

More specifically, embodiments of the invention may improve the likelihood that a backup system that provides data storage services to clients has sufficient storage capacity to store client data. For example, by forecasting future storage capacity requirements, the backup system may modify its client data storage behavior to increase the likelihood that sufficient computing resources will be available to service the predicted client storage needs in the future.

Embodiments of the invention may reduce the likelihood of storage service failures by a backup system. By doing so, embodiments of the invention may improve the reliability of both the backup system and the clients that store data in the backup system. For example, since the clients depend on the backup system for data storage services, a backup system failure automatically impairs the ability of clients to perform their respective functions. Accordingly, one or more embodiments of the invention address the problem data storage failures in a network environment. The aforementioned problem arises due to the nature of the technological environment in which multiple clients store data in a backup system. Since the aggregate behavior of the clients is difficult to predict due to differing roles and/or locations of the clients, it can be very challenging to ensure that a backup system has sufficient storage resources to store client data While embodiments of the invention have been described as addressing one or more problems, embodiments of the invention are applicable to address other problems and the scope of the invention should not be limited to addressing the problems specifically discussed throughout this application.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A backup system for storing a copy of client data, comprising:
   a persistent storage for storing the copy of the client data; and
   a forecaster programmed to:
      obtain storage use rates of the persistent storage over a prior time period;
      select a first prediction period based on the prior time period;
      partition the prior time period to obtain a plurality of partitioned time periods;
      fuzzify the storage use rates over the prior time period to obtain fuzzified storage use rates over the prior time period;
      apply a higher order fuzzy time series operator to the fuzzified storage use rates over the prior time period to obtain a plurality of higher order forecasting functions;
      calculate a fuzzified forecast for the selected first prediction period using the higher order forecasting functions; and
      defuzzify the fuzzified forecast to obtain a forecast for the first prediction period.

2. The backup system of claim 1, wherein the forecaster is further programmed to:

make a determination that the forecast specified a used storage capacity that is larger than a predetermined storage capacity; and in response to the determination, modify a backup policy associated with the client data to reduce a rate of storing the copy of the client data in the persistent storage.

3. The backup system of claim 2, wherein modifying the backup policy comprises:

reducing a frequency of backup up the copy of the client data.

4. The backup system of claim 2, wherein modifying the backup policy comprises:

selecting a portion of the client data; and removing the selected portion from the client data specified for backup during future backups of the client data.

5. The backup system of claim 2, wherein the predetermined storage capacity is a storage capacity of the persistent storage.

6. The backup system of claim 1, wherein the forecaster is further programmed to:

make a determination that the forecast specified a used storage capacity that is larger than a predetermined storage capacity; and in response to the determination, notify a user of the determination.

7. The backup system of claim 6, wherein the predetermined storage capacity is half of the storage capacity of the persistent storage.

8. The backup system of claim 1, wherein obtaining the storage use rates of the persistent storage over the prior time period comprises:

monitoring a used storage capacity of the persistent storage on a daily basis;

for each day of the prior time period, identifying a maximum used storage capacity during the respective day based on the monitoring; and generating a time series relationship between each day of the prior time period and the respective identified maximum used storage capacity during the respective day.

9. The backup system of claim 8, wherein fuzzyifying the storage use rates over the prior time period comprises:

obtaining a plurality of linguistic terms;

matching each identified maximum used storage capacity to a linguistic term of the plurality of linguistic terms; and generating a time series relationship between each day of the prior time period and the linguistic term matched to the respective identified maximum used storage capacity during the respective day.

10. The backup system of claim 1, wherein a forecast for the first prediction period specifies a used storage capacity over the first prediction period.

11. The backup system of claim 1, wherein the forecaster is further programmed to:

make a first determination that the forecast specified a used storage capacity that is larger than a first predetermined storage capacity and less than a second predetermined storage capacity; and in response to the first determination, notify a user of the determination.

12. The backup system of claim 11, wherein the forecaster is further programmed to:

make a second determination that a second forecast associated with a second prediction time period specified a second used storage capacity that is larger than the second predetermined storage capacity; and in response to the second determination, modify a backup policy associated with the client data to reduce a rate of storing the copy of the client data in the persistent storage, wherein the second used storage capacity is larger than the used storage capacity.

13. A method for operating a backup system, comprising:

obtaining storage use rates of a persistent storage over a prior time period, wherein the persistent storage stores a copy of client data;

selecting a first prediction period based on the prior time period;

partitioning the prior time period to obtain a plurality of partitioned time periods;

fuzzifying the storage use rates over the prior time period to obtain fuzzified storage use rates over the prior time period;

applying a higher order fuzzy time series operator to the fuzzified storage use rates over the prior time period to obtain a plurality of higher order forecasting functions;

calculating a fuzzified forecast for the selected first prediction period using the high order forecasting functions; and defuzzifying the fuzzified forecast to obtain a forecast for the first prediction period.

14. The method of claim 13, further comprising:

making a determination that the forecast specified a used storage capacity that is larger than a predetermined storage capacity; and in response to the determination, modifying a backup policy associated with the client data to reduce a rate of storing the copy of the client data in the persistent storage.

15. The method of claim 14, wherein modifying the backup policy comprises:

selecting a portion of the client data; and removing the selected portion from the client data specified for backup during future backups of the client data.

16. The method of claim 14, wherein modifying the backup policy comprises:

reducing a frequency of backup up the copy of the client data.

17. A non-transitory computer readable medium comprising computer readable program code, which when executed by a computer processor enables the computer processor to perform a method for operating a backup system, the method comprising:

obtaining storage use rates of a persistent storage over a prior time period, wherein the persistent storage stores a copy of client data;

selecting a first prediction period based on the prior time period;

partitioning the prior time period to obtain a plurality of partitioned time periods;

fuzzifying the storage use rates over the prior time period to obtain fuzzified storage use rates over the prior time period;

applying a higher order fuzzy time series operator to the fuzzified storage use rates over the prior time period to obtain a plurality of higher order forecasting functions;

calculating a fuzzified forecast for the selected first prediction period using the high order forecasting functions; and defuzzifying the fuzzified forecast to obtain a forecast for the first prediction period.

18. The non-transitory computer readable medium of claim 17, wherein the method further comprises:

making a determination that the forecast specified a used storage capacity that is larger than a predetermined storage capacity; and in response to the determination, modifying a backup policy associated with the client data to reduce a rate of storing the copy of the client data in the persistent storage.

19. The non-transitory computer readable medium of claim 18, wherein modifying the backup policy comprises:
   selecting a portion of the client data; and
   removing the selected portion from the client data specified for backup during future backups of the client data.

20. The non-transitory computer readable medium of claim 18, wherein modifying the backup policy comprises:
   reducing a frequency of backup up the copy of the client data.

* * * * *

UNITED STATES PATENT AND TRADEMARK OFFICE
CERTIFICATE OF CORRECTION

PATENT NO. : 10,509,586 B2
APPLICATION NO. : 15/960665
DATED : December 17, 2019
INVENTOR(S) : Rahul Vishwakarma and Supriya Kannery Page 1 of 1

It is certified that error appears in the above-identified patent and that said Letters Patent is hereby corrected as shown below:

In the Claims

Column 19, Line 9, in Claim 3, the phrase "frequency of backup up the copy" should read
-- frequency of backup of the copy --.

Column 20, Line 41, in Claim 16, the phrase "frequency of backup up the copy" should read
-- frequency of backup of the copy --.

Column 21, Line 15, in Claim 20, the phrase "frequency of backup up the copy" should read
-- frequency of backup of the copy --.

Signed and Sealed this
Eighteenth Day of February, 2020

Andrei Iancu
*Director of the United States Patent and Trademark Office*